US006191863B1

(12) United States Patent
Gay

(10) Patent No.: US 6,191,863 B1
(45) Date of Patent: Feb. 20, 2001

(54) DEVICE AND PROCESS FOR EXTINGUISHING A SOURCE

(75) Inventor: Jean Gay, Nice (FR)

(73) Assignee: Centre National de la Recherche Scientifique, Paris Cedex (FR)

( * ) Notice: Under 35 U.S.C. 154(b), the term of this patent shall be extended for 0 days.

(21) Appl. No.: 09/381,855

(22) PCT Filed: Mar. 24, 1998

(86) PCT No.: PCT/FR98/00590

§ 371 Date: Sep. 27, 1999

§ 102(e) Date: Sep. 27, 1999

(87) PCT Pub. No.: WO98/43054

PCT Pub. Date: Oct. 1, 1998

(30) Foreign Application Priority Data

Mar. 26, 1997 (FR) .................................................. 97 03717

(51) Int. Cl.⁷ .................................................. G01B 9/02
(52) U.S. Cl. .............................................................. 356/450
(58) Field of Search ............................................ 356/450

(56) References Cited

PUBLICATIONS

J. Gay et al., "Principe d'un coronographe interferentiel", *Comptes Rendus de l'Academic des Sciences Serie II. Mecanique–Physique–Chemie–Astronomie*, vol. 322, No. 3, Feb. 1996, pp. 265–271.

Wei Shen et al., "Application of a Shack cube as a beam splitter in interferometers with a local reference beam", *Applied Optics*, vol. 35, No. 34, Dec. 1996, pp. 6648–6654.

*Primary Examiner*—Robert Kim
(74) *Attorney, Agent, or Firm*—Young & Thompson

(57) ABSTRACT

The invention relates to a device and process for extinguishing a source. Said device comprises an interferometer (2) which receives an incident light beam (10) emanating from a central point source. The interferometer has a separator (4) separating the incident beam into two secondary beams (13, 14) with the same focal power, and two arms (5,6) each equipped with an optical system, and having optical paths of equal length. Combining elements (7) merge the secondary beam into one output beam (12).

12 Claims, 3 Drawing Sheets

DEVICE AND PROCESS FOR EXTINGUISHING A SOURCE

The present invention relates to a device and a process for extinguishing a source and an achromatic interferential coronograph.

Different types of coronographs are known. They enable observations in the vicinity of a principal source and constitute in a certain way antiglare systems. The coronographs are used in astronomy and have applications in the research or the examination of entities in the vicinity of a central star, such as close stars.

The occultation coronographs, used conventionally, block the central portion of an incident beam from a central source while letting through the peripheral portion of the beam. The shortcoming of these coronographs is that they do not extinguish totally the contribution of the central source, since they let through a fraction of light forming rings far away from the diffraction spot. Increasing the dimension of the occultation enables to reduce this fraction of light, but the cost is the total loss of efficiency in areas close to the central source. The occultation coronographs are therefore not suited to the observation of objects in the close vicinity of the central source, whereas these objects are of relative small dimensions and thus hardly detectable because of the glare caused by the central source.

Such an interference extinguishing system has been suggested, involving two telescopes. The shortcoming of such a system is to call for cophasing of both telescopes and to generate a chromatic source extinguishing.

Jean GAY and Yves RABBIA have suggested in an article 'principle of an interferential coronography' published in C. R. Acad. Sci. Paris. Vol. 322, series 2b, pp. 265–271, 1996, a device for extinguishing a source, cancelling the contribution of a punctual source in an achromatic fashion. The coronograph suggested comprises an interferometric means, consisting of a beam splitter that splits an incident beam in two secondary beams having the same optical power and two arms having optical paths of the same length. The arms are provided with afocal systems having opposite enlargements that produce pupil turn-up in one of both arms.

The article of Wei shen et al. 'Application of a shack cube as a beam splitter in interferometers with a local reference beam', published in the magazine Applied Optics, vol. 35, no. 34, pp. 6648–6654, December 1996, relates to the test of a convergent wave front using a Shack cube used as a beam splitter in a Mach-Zehnder interferometer. The technique described enables to control an optical surface made up of such a convergent wave front.

The object of the invention is a coronograph that enables to observe objects in the close vicinity of a central star, such as an exoplanet, gas envelopes and circumstellar dusts and protoplanetary disks.

The invention thus relates to a coronograph enabling to extinguish the effects of a central source in its immediate vicinity, i.e. up to an angular distance projected onto the sky equal to one third of the first radius of the spot of the Airy spot, with rigorous achromatism.

The invention aims at such a coronograph that improves mastering chromatic and/or spherical chromatic aberrations differential with respect to the article mentioned above of Jean GAY and Yves RABBIA, and/or allowing to meet particular requirements, such as for example forming an image at a preset distance in an on-board assembly or obtaining an enlargement fixed at the output.

The invention relates more generally to a device for extinguishing a source, enabling to extinguish the effects of a central source up to its immediate vicinity and in an achromatic fashion, which is simple to realise, easy to implement and accurate.

The object of the invention is also a process for extinguishing a source, thereby cancelling the effects of a central source closest to this source with rigorous achromatism.

To this end, the invention relates to a device for extinguishing a source comprising:

means for receiving an incident light beam emanating from a punctual central source, a beam splitter receiving the incident beam from the receiving means and separating this beam into two secondary beams having the same optical power, two arms each provided with an optical system and traversed respectively by the secondary beams, whereas the arms have optical paths of the same length and whereas the optical systems have opposite enlargements causing pupil turn-up in one of both arms with respect to the pupil of the other arm, and means to combine secondary beams into an output beam, so that the contribution of the punctual source is cancelled in the output beam.

According to the invention, the optical systems having focuses, principal planes and antiprincipal planes, each of the focuses, principal planes and antiprincipal planes of one of the two optical systems is respectively superimposed to a focus, an antiprincipal plane and a principal plane of the other optical system after formation of the output beam. Moreover, the arms each having a number of passages through at least one of the focuses of the optical system corresponding to this arm, the number of passages differs by an odd number.

While stating that the incident beam 'originates from a punctual central source', we mean that the beam is transmitted from an area comprising a light source on which the beam is centred. The source is said to be punctual with reference to the weak angular radii that it occupies in the incident beam. More precisely, if we want an extinction better than 1/m, both following conditions must be respected:

the alignment of the punctual source must not deviate from the ideal position by more than one angle θ carried over infinitely (on the sky in the case of a coronograph), the angle θ being given in relation to the radiation of wavelength λ and to the diameter D of a lens of the receiving means (diameter of the telescope for a coronograph), by the relation:

$$\theta = (\lambda/D) \cdot (\infty \sqrt{2}/\pi \infty \sqrt{m})$$

the dimension of the source must not overflow infinitely (on the sky in the case of a coronograph) of a circle of angular radius ω, whereas the radius ω is given by:

$$\omega = (\lambda/D) \cdot (2/\pi \sim \sqrt{m}).$$

The device for extinguishing a source can also serve to eliminate the influence of the central portion of a light source associated with an angular radius greater than that defined above, notably if the luminosity of the source is concentrated essentially in this central portion. In such a case, we designate by 'punctual central source' the central portion of the source to be extinguished.

An additional condition that the incident beam must check, which carries a wave originating from the punctual central source, is that this wave is centrosymmetrical. This condition can be explained in the following way. The incident beam propagating along a propagation axis on which is centred the punctual central source, we define the symmetry of the wave originating from the source, with respect to the axis of propagation. To achieve a global extinction better than 1/m at the output for the radiation of wavelength $\lambda$, the mean quadratic deviation $\epsilon'$ between the wave and its symmetry must then check the equation:

$$\epsilon' \leq \lambda/2\pi\infty\sqrt{m}$$

An additional condition to achieve an extinction better than 1/m concerns the arms traversed by the secondary beams. The arms must generate to do so a differential velocity $\delta$ along the radii on the principal axis which bears out the equation:

$$\delta \leq \lambda/2\pi\infty\sqrt{m}$$

The device for extinguishing a source is based on an interferometric assembly comprising the beam splitter, the two arms provided with optical systems and the means of combination. The interferometer can be for instance of the Michelson or Mac-Zehnder type.

The effects of the central source are extinguished by a destructive interference between any point of the output field for all the radiations, whatever the frequency. Thus, the extinction is achromatic.

Extinction by destructive interference can be explained by the fact that each passage of one of both secondary beams through the focus causes additional phase shift by a $\pi$ value. As the number of passages of one of the secondary beams through the focus is greater by an odd number than the number of passages of the other secondary beam, both secondary beams are combined with a phase shift equal to $\pi$ (modulo $2\pi$) which causes the destructive interference. It is well understood that the number of passages through the focus on one of the two arms can be equal to zero.

Conversely, the radiation of any source surrounding the central source is transmitted at the output. In such a case, the surrounding source generates two centrosymmetrical images at the output. Indeed, the surrounding source being at a distance angle with respect to the axis of propagation of the incident beam, two wave planes are generated at the output by this surrounding source, describing an angle equal to twice the distance angle with respect to the axis of propagation of the output beam and forming two separate images in the image plane.

By contrast with the device disclosed in the article of Jean GAY and Yves RABBIA mentioned above, the optical systems are not afocal. The device for extinguishing a source according to the invention has the surprising advantage of allowing reduction of differential aberrations and giving the possibility of meeting predetermined requirements, such as enlargement or the position at the output.

Preferably, the combination means of the secondary beams are formed by the splitter.

In a preferred embodiment, the splitter, the arms and the combination means are made up of an assembly around a splitter cube.

Such a system advantageously has a moderate weight and a facility of manipulation. It comprises preferably catadioptrical optical elements, glued or held in place by molecular adherence and preset during assembly.

It is useful that the assembly should be fitted with means for adjusting the differential velocity between the secondary beams. These adjustment means enable to impose the differential velocity to be nil or to compensate for its residual derivates. In a first advantageous embodiment, the adjustment means consist of a piezo-electric system. In a second advantageous embodiment, they consist of a pneumatic system. In this second embodiment, each arm of the interferometer comprises the same trapped gas and a pneumatic check is exerted while acting on the differential pressure of the gas between the arms.

It is also interesting that the assembly comprises means to control the differential velocity. Advantageously, this control is conducted in a static way using a laser beam passing through the assembly in a direction opposite to the normal direction and slightly off-centre, in order to highlight a field of two luminous fringes around a black central fringe on a pupilar image. Then, the fluxes on either side of an ideal position of the black central fringe are balanced. This check is preferably performed with a white light source, whereas the check is made possible by the fact that the differential velocity is equal to zero.

Preferably, the splitter cube is based on evanescent wave filters.

These filters are also called total frustrated reflection filters. The reflection and transmission coefficients of the splitter cube being respectively equal to R and T, we can obtain a 4-RT efficiency quite close to 1, a low polarisation and very good symmetry of the secondary beams.

The splitter cube comprises preferably two 45°-prisms with evanescent waves having a prism index, separated by an interstice having an interstice index, whereas the ratio of the prism index to the interstice index is approximately $\infty\sqrt{3}$.

In a first embodiment of the splitter cube, the prisms consist of sapphire and the interstice is empty. In a second embodiment, the prisms are made up of ZnSe and the interstice consists of a material selected among $SiO_2$ and $CaF_2$.

Advantageously, the assembly comprises an input for the input beam of a first side of the cube, an output for the output beam of a second side of the cube close to the first side, two convex diopters for the passage of the secondary beams respectively placed on the third and fourth sides of the cube opposite to the first and second sides and two concave mirrors respectively facing the diopters at the same distance.

In a preferred embodiment, the diopters and the mirrors are then spherical, whereas each diopter is aligned with the associated mirror along an axis perpendicular to the associated side, and the radii r1 and r2 of the diopters and R1 and R2 of the mirrors are given in relation to the distance e between each of the diopters and the associated mirror and to two parameters q and Q by the equations:

$$R1 = e \cdot [Q/(Q+1)]$$

$$R2 = e \cdot [(Q/(Q-1)]$$

$$r1 = e[2(N-1)]/[Q(q+1)]$$

$$r2 = e \cdot [2(N-1)]/[Q(q-1)]$$

The relations mentioned above provide equality of the optical trajectories of both secondary beams, as well as the characteristic of the device for extinguishing the source according to the invention of superimposed focuses, principal planes and antiprincipal planes.

Preferably, the parameters e, q and Q are chosen in order to minimise the differential aberrations of the assembly.

In order to minimise the differential aberrations for a foreseen operating position, we consider a target point at the input of the assembly and its images by both arms of the interferometer. Both images are confused for a reference radiation, which is a centring radiation registered by the index 0. To minimise the differential aberrations, we make sure that, by deviating from this reference radiation, the images of the input point remain at a distance which the closest possible to zero. We therefore seek a minimum differential chromatic aberration, then a minimum differential spherical aberration.

In an embodiment variation, we determine the parameters e, q and Q in order to impose and enlargement at the output and/or a position at output.

In an embodiment variation of the compact assembly, the latter comprises achromatised combinations instead of spherical diopters.

The superimposition of the geometrical entities (focuses, principal planes and antiprincipal planes) after formation of the output beam must be understood as follows. Each of the secondary beams follows a distinct trajectory before both secondary beams combine themselves in the output beam. In order to know whether both geometrical entities are superimposed, after combination, both arms of the interferometer are brought to a fictitious reference trajectory between the splitter and the combination means. Two geometrical entities are said to be 'superimposed' after formation of the output beam if, and only if, they are superimposed for the fictitious trajectory.

The invention also relates to an achromatic interferential coronograph. According to the invention, this coronograph comprises a device according to the invention.

Such a coronograph can be fitted on a ground telescope or an on-board telescope. It is applicable to the research and study of exoplanets, cold companions (black dwarfs) and double stars with high magnitude deviations and clustered together, hence with rapid orbits and ideal for dynamic determinations of stellar masses. Another astrophysical application concerns the detection of protoplanetary disks (type β Pic) and of dust shrouds around evolved stars.

The invention also relates to a process for extinguishing a source. In this process, an incident luminous beam is received, coming from a punctual central source, the incident beam is sent to an interferometer and the incident beam is separated into two secondary beams of the same optical power, the secondary beams are made to travel in the interferometer over optical trajectories of the same length and opposite enlargements are generated for the secondary beams, causing pupil turn-up for one of the secondary beams, and the secondary beams are combined into an output beam, so that the punctual source has an extinguished contribution in the output beam.

According to the invention, each of the secondary beams passing through an optical system possessing focuses, principal planes and antiprincipal planes, each of the focuses, principal planes and antiprincipal planes of one of the two optical systems is respectively superimposed to a focus, an antiprincipal plane and a principal plane of the other optical system after formation of the output beam. Moreover, each of the secondary beams having a number of passages through at least one of the focuses of the optical system corresponding to this secondary beam, the numbers of passages differ by an odd number.

The invention will be better understood by the following description of certain embodiments and implementations, given for exemplification purposes in view of the appended drawings.

Figure 1:
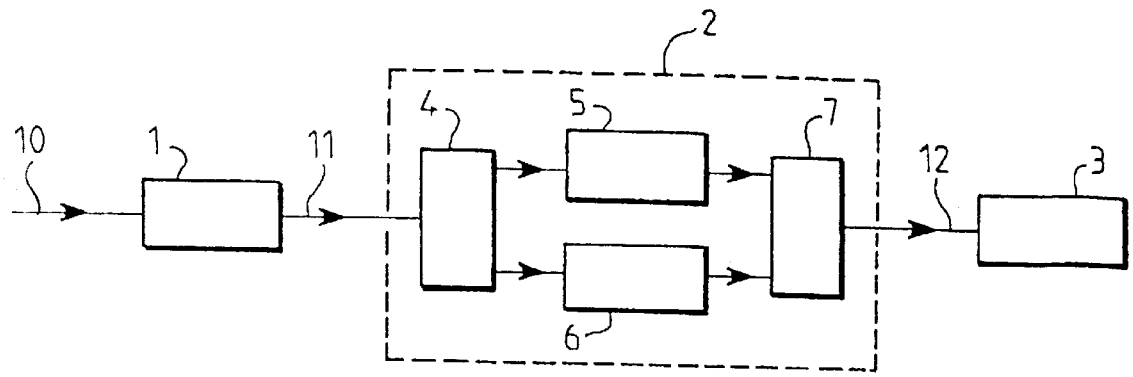
FIG. 1 is a flow chart of a device for extinguishing a source according to the invention.

A device for extinguishing a source according to the invention, represented on FIG. 1, comprises receiving means 1 of an incident luminous beam 10 sending back an input luminous beam 11, an interferometer 2 transmitting an output beam 12 and visualisation means 3 of the output beam 12. The interferometer 2 comprises a beam splitter 4 receiving the input beam 11 and splitting it into two secondary beams 13 and 14, two arms 5 and 6 travelled respectively by the secondary beams 13 and 14 and means 7 for combining the secondary beams 13 and 14 into the output beam 12.

The splitter 4 gives the secondary beams 13 and 14 the same optical power and the arms 5 and 6 have optical paths of the same length.

Figure 2:
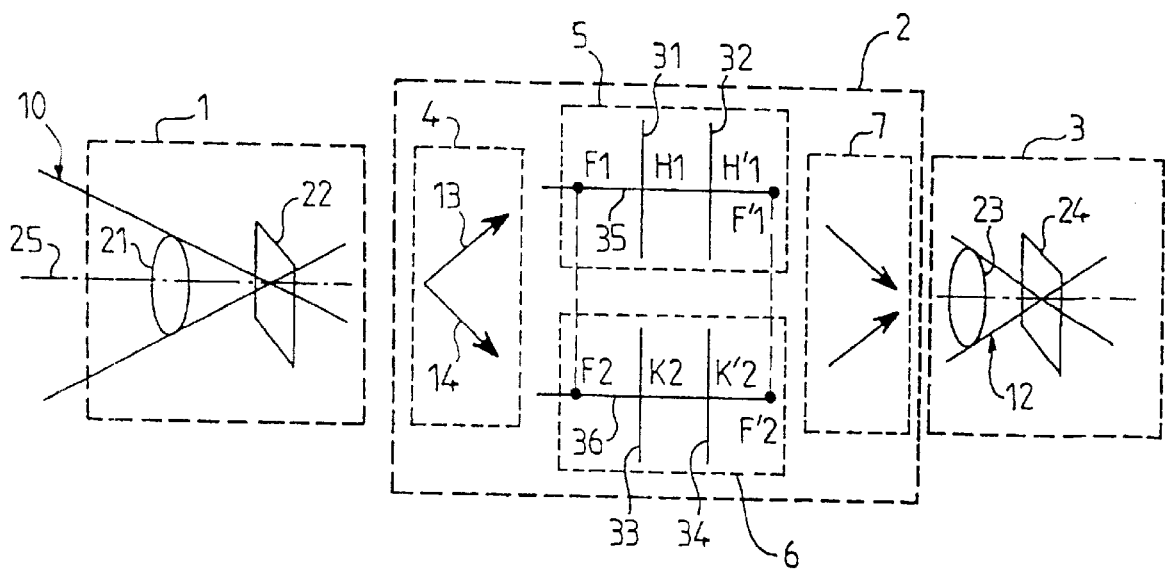
FIG. 2 represents a principle diagram explaining the operation of a device for extinguishing a source according to the invention.

In a more detailed way, as represented on FIG. 2, the receiving means 1 comprise an input pupil 21 receiving the incident beam 10. This pupil 21 is for example the pupil of a telescope. The incident beam 10, propagating before reception along a direction of propagation 25, becomes the input beam 11, which can be visualised, in an input plane 22. The visualisation means 3, in which the image 23 of the pupil 21 can be represented, comprise a visualisation screen in an output plane 24. The output screen 24 can be replaced with any other means for processing the image obtained, such as for example means for digital recording or for measuring.

The arms 5 and 6 of the interferometer 2 are each provided with an optical system.

FIG. 2 represents respective input focuses F1 and F2 and respective output focuses F'1 and F'2 of the optical systems of both arms 5 and 6, as well as principal input 31 and output 32 planes of the arm 5 and antiprincipal input 33 and output 34 planes of the arm 6. The planes 31–34 are located respectively by the points of intersection H1, H'1, K2, K'2 thereof with the axes of propagation of the secondary beams 13 and 14. In the meaning given previously, the focuses F1 and F2 are superimposed after formation of the output beam 12 as well as the focuses F'1 and F'2, as well as the planes 31 and 33 and the planes 32 and 34. Schematically on FIG. 2, the secondary beams 13 and 14 are represented by their propagation axes 35 and 36, whereas the axes 35 and 36 are plotted parallel. An abscissa is defined parallel to the axes of propagation 35 and 36, two superimposed geometrical entities are represented on the same abscissa.

Figure 3A:
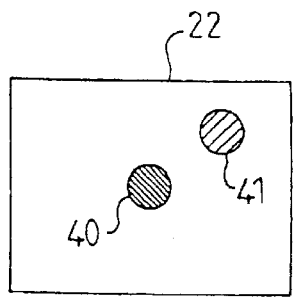
FIG. 3A is a simplified representation of an input plane of a device for extinguishing a source such as represented on FIG. 2.
Figure 3B:
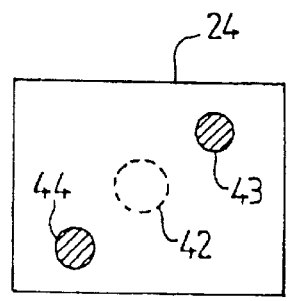
FIG. 3B is a simplified representation of an output plane achieved with a device for extinguishing a source such as represented on FIG. 2 and corresponding to the input plane on FIG. 3A.

In operation, the incident beam 10 is received from a punctual central source. In an illustrative example, represented on FIG. 3A, the input plane 22 shows a central spot 40 corresponding to the central source and a neighbouring spot 41 of slightly smaller intensity, corresponding to a source close to the central source. Then the input beam 11 is sent to the interferometer 2, it is split into secondary beams 13 and 14 which are caused to travel over the arms 5 and 6, the secondary beams 13 and 14 are combined into the output beam 12 and the output beam 12 is visualised in the output plane 24. In the example presented, as can be seen on FIG. 3B, the extinction of the contribution of the central source in the output plane 24 can be observed. This is shown schematically on FIG. 3B by the dotted line of a central disk 42. The neighbouring source, for its own part, generates two images 43 and 44 symmetrical with respect to the centre of the field.

Figure 4:
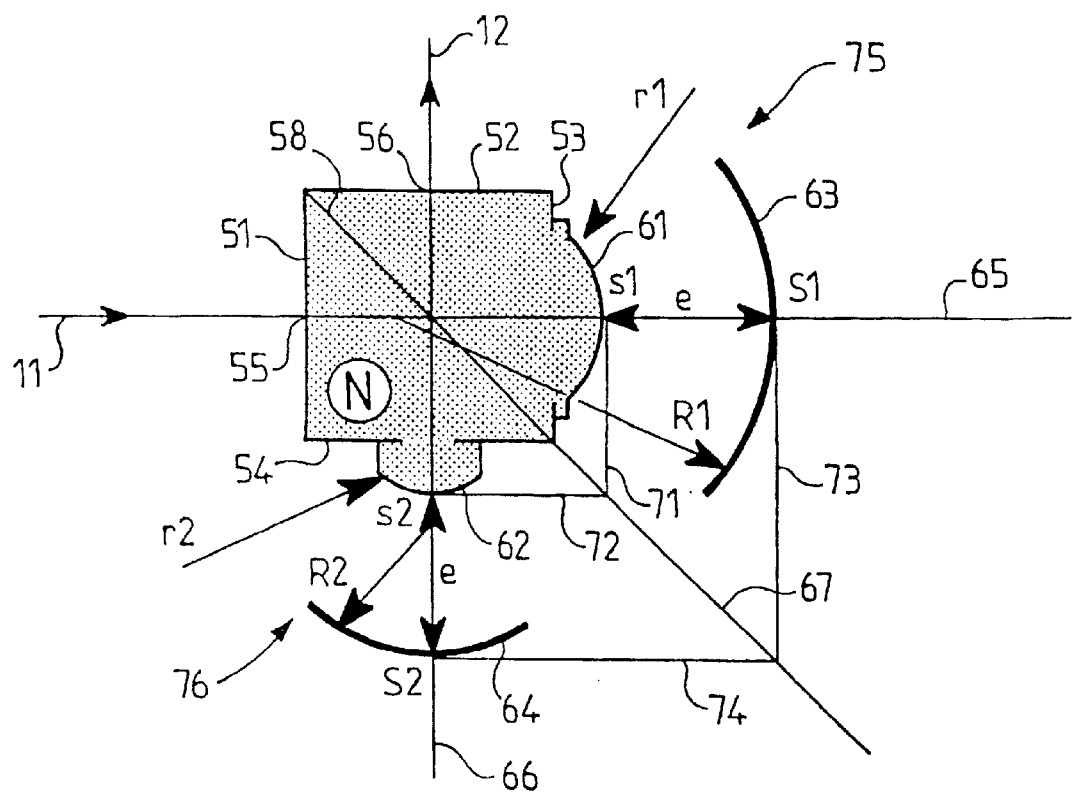
FIG. 4 shows a compact assembly of a device for extinguishing a source according to the invention.

In a particular embodiment of the device for extinguishing a source according to the invention, represented on FIG. 4, the interferometer 2 has the shape of a compact assembly around a splitter cube 50. The cube 50 comprises an input 55 of the incident beam 11 of a first side 51, an output 56 of the output beam 12 of a second side 52 close to the first side 51 and two convex diopters 61 and 62 of respective passages of the secondary beams 13 and 14, placed respectively on a third side 53 opposite to the first side 51 and on a fourth side 54 opposite to the second side 52. The compact assembly also comprises two concave mirrors 63 and 64 respectively facing the diopters 61 and 62. The cube 50 comprises a separation surface operating as a splitter 58, arranged according to a diagonal plane 67 intersecting the intersection of the first two sides 51 and 52 and the intersection of the two last sides 53 and 54.

Figure 5:
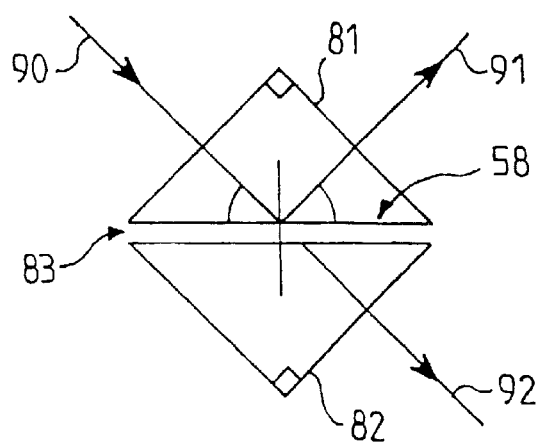
FIG. 5 represents an embodiment of the beam splitter of the compact assembly of FIG. 4.

The splitter cube 50 is preferably formed around evanescent wave filters, such as represented on FIG. 5. Advantageously, the cube 50 comprises thus two prisms 81 and 82 with evanescent waves separated by an interstice 83. The filters 81 and 82 have an index N and the interstice 83 has an index n and a thickness d. The interstice 83 defines the separation plane 58. Preferably, each of the prisms 81, 82 forms one half of a cube, whereby both halves are separated by a diagonal plane passing through two sides opposite of the cube. Thus, the assembly made up of the prisms 81 and 82 and of the interstice 83 enables to reconstitute directly the geometry of the splitter cube 50. In this configuration, the prisms 81 and 82 are triangular-rectangular in section, comprising a right angle opposite to an interface side with the interstice 83. The ratio of the indices N and n verifies in this case the following equation:

$$N/n = \infty \sqrt{3}$$

In a first example of this preferred embodiment, the prisms 81 and 82 consist of sapphire and the interstice is empty. This first example is satisfactory for an infrared use, for which the sapphire has an index N equal to 1.72.

In a second embodiment, the prisms 81 and 82 consist of ZnSe and the interstice 83, of $SiO_2$. The thickness d of the interstice 83 is advantageously 0.3 $\mu$m. This second example is very satisfactory in the visible range and in the close infrared (wavelength smaller than 4 $\mu$m).

In a third embodiment, the prisms 81 and 82 consist of ZnSe and the interstice 83, of $CaF_2$. Advantageously, the thickness d of the interstice 83 is then 1.2 $\mu$m. This third example is very satisfactory in the visible range and the infrared up to 13 $\mu$m.

In the second and the third examples, the interstice 83 is, in a first embodiment, made using vacuum deposits followed by a gluing operation, with a glue of index close to 2.5 and transparent in the infrared. In a second embodiment, the vacuum deposits are followed by a molecular adherence. In a third embodiment for a thick layer, two semi-layers are formed respectively on both prisms 81 and 82 and molecular adherence then takes place.

In operation, a beam 90 reaches at right angle a face of the first prism 81 and passes through this prism 81 up to the interstice 83. The beam 90 is then split into a reflected beam 91 which passes through the first prism 81 and into a transmitted beam 92 which passes through the second prism 82. Thanks to the properties of the prisms 81 and 82 and of the interstice 83, the beams 91 and 92 are symmetrical with respect to the separation plane 58 and have the same optical power.

In a preferred embodiment, as represented on FIG. 4, the diopters 61, 62 and the mirrors 63, 64 are spherical, the diopter 61 being aligned with the mirror 63 along an axis 65 perpendicular to the third side 53 of the cube 50, and the diopter 62 being aligned with the mirror 64 along an axis 66 perpendicular to the fourth side 54. Each of the mirrors 63, 64 is then situated at the same distance e from the associated diopter 61 or 62.

The diopter 61 and the mirror 63 having respectively apexes s1 and S1 arranged on the axis 65 and the diopter 62 and the mirror 64 having respectively apexes s2 and S2 arranged on the axis 66, the distance e is measured between the apex s1 or s2 of one of the diopters 61 and 62 and the apex S1 or S2 of the corresponding mirror 63 or 64.

The diopter 61 and the mirror 63 provide a first arm 75 of the compact assembly centred on the axis 65, while the diopter 62 and the mirror 64 provide a second arm 76 of the compact assembly centred on the axis 66. Equal distances s1S1 and s2S2 ensures equality of the optical trajectories in both arms 75 and 76.

The diopters 61 and 62 and the mirrors 63 and 64 having respectively radii r1, r2, R1 and R2, whereas these radii are given in relation to the distance e and two parameters q and Q by:

$$R1 = e \cdot [Q/(Q+1)]$$
$$R2 = e \cdot [(Q/(Q-1)]$$
$$r1 = e[2(N-1)]/[Q(q+1)]$$
$$r2 = e \cdot [2(N-1)]/[Q(q-1)]$$

The diopters 61 and 62 have respectively tangent planes 71 and 72 at their apexes s1 and s2 whose intersection is included in the diagonal plane 67. Similarly, the mirrors 63 and 64 have tangent planes 73 and 74 at their apexes S1 and S2 whose intersection is included in the diagonal plane 67.

Figure 6:
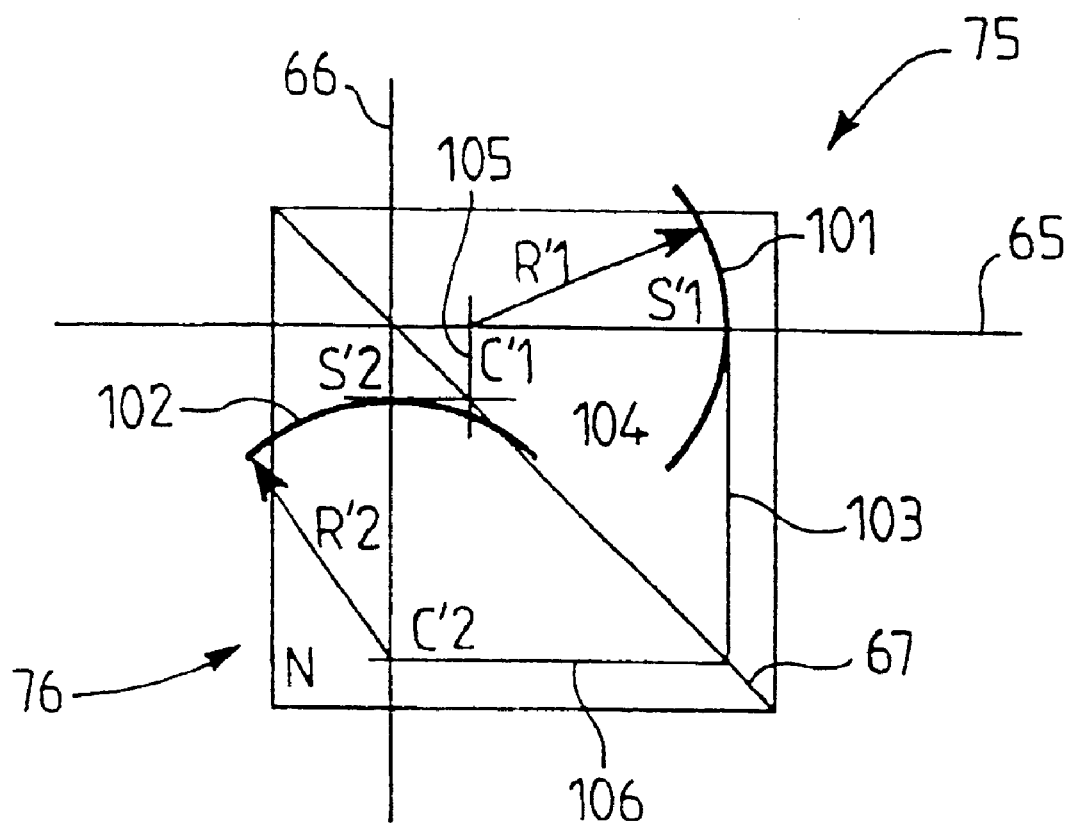
FIG. 6 shows the geometrical properties of equal mirrors of the compact assembly of FIG. 4.

For better illustration of the operation of the compact assembly of FIG. 4, FIG. 6 represents the respective images of the mirrors 63 and 64 by the diopters 61 and 62. These images are respectively spherical, virtual, mirrors 101 and 102. The mirror 101 has a centre C'1 and an apex S'1 arranged on the axis 65 and a radius R'1. The mirror 102 has a centre C'2 and an apex S'2 arranged on the axis 66, and a radius R'2. The mirrors 101 and 102 are represented immersed in the medium of index N forming the cube 50.

The focuses of the first optical system, providing the first arm 75, are the centre C'1 and the apex S'1. The first optical system has a principal plane 103 passing through the apex S'1 and tangent to the mirror 101, and an antiprincipal plane 105 passing through the centre C'1 and parallel to the plane 103. Similarly, the second arm 76 is fitted with a second optical system having focuses, which are the centre C'2 and the apex S'2, the principal plane 104 passing through the apex S'2 and tangent to the mirror 102 and an antiprincipal plane 106 passing through the centre C'2 and parallel to the plane 104.

Thanks to the previous relations of the compact assembly, the radii R'1 and R'2 are equal, the principal plane 103 of the first optical system and the antiprincipal plane 106 of the second optical system have an intersection included in the diagonal plane 67 and the antiprincipal plane 105 of the first optical system and the principal plane 104 of the second optical system also have an intersection included in the diagonal plane 67. Thus, each of the focuses, of the principal planes and of the antiprincipal planes of one of both optical systems is respectively superimposed to a focus, an antiprincipal plane and a principal plane of the other optical system after formation of the output beam 12.

In operation, the input beam 11 is introduced into the cube 50 via the inlet 55, along the direction of the axis 65. The input beam 11 is split at the splitter plane 58 into a transmitted beam, which travels over the first arm 75 of the compact assembly and into a reflected beam which travels over the second arm 76. Both secondary beams are then combined at the splitter plane 58 into the output beam 12, which is collected at the output 56 parallel to the axis 66.

Advantageously, the distance e and the parameters q and Q are selected in order to minimise the chromatic and spherical differential aberrations. According an embodiment, the enlargement at the output and/or the position at the output is/are imposed.

The splitter cube can be replaced with another type of splitter, for instance in the shape of a rectangle or a rhombus. Such a shape can achieved directly by joining two prisms of the requested shape, whereas these prisms are advantageously based on evanescent wave filters. The ratio of the indices of the prisms and of the interstice between the prisms must then be adjusted accordingly so that the splitter provides two symmetrical secondary beams having the same optical power.

In other embodiments, diopters and non spherical mirrors are used, while replacing for example the spherical diopters with achromatised combinations.

What is claimed is:

1. A device for extinguishing a source comprising:
   means (1) for receiving an incident light beam (10) emanating from a punctual central source,
   a beam splitter (4, 58) receiving the incident beam (10) from the receiving means (1) and separating the said beam (10) into two secondary beams (13, 14) having the same optical power,
   two arms (5, 6, 75, 76) each provided with an optical system and traversed respectively by the secondary beams (13, 14), whereas the arms (5, 6, 75, 76) have optical paths of the same length and whereas the optical systems have opposite enlargements causing pupil turn-up in one of both arms (76) with respect to the pupil of the other arm (75), and
   means (7, 58) to combine secondary beams (5, 6, 75, 76) into an output beam (12), so that the contribution of the punctual source is cancelled in the output beam (12),
   characterised in that the said optical systems having focuses (F1, F2, F'1, F'2, C'1, C'2, S'1, S'2), principal planes (31, 32, 103, 104) and antiprincipal planes (33, 34, 105, 106), each of the focuses, principal planes and antiprincipal planes of one of the two optical systems is respectively superimposed on a focus, an antiprincipal plane and a principal plane of the other optical system after formation of the output beam (12) and the arms (5, 6, 75, 76) each having a number of passages through at least one of the focuses of the optical system corresponding to the said arm, the number of passages differs by an odd number.

2. A device according to claim 1, characterised in that the means (7) for combining the secondary beams (13, 14) are formed by the splitter (58).

3. A device according to claim 1, characterised in that the splitter (58), the arms (75, 76) and the combination means (58) are made up of an assembly around a splitter cube (50).

4. A device according to claim 3, characterised in that the splitter cube (50) is based on evanescent wave filters.

5. A device according to claim 4, characterised in that the splitter cube (50) comprises two 45°-prisms (81, 82) with evanescent waves having a prism index (N) separated by an interstice (83) having an interstice index, (n), whereas the ratio N/n) of the prism index (N) to the interstice index (n) is approximately $\infty\sqrt{3}$.

6. A device according to claim 5, characterised in that the prisms (81, 82) consist of sapphire and the interstice (83) is empty.

7. A device according to claim 5, characterised in that the prisms (81, 82) are made up of ZnSe and the interstice (83) consists of a material selected among $SiO_2$ and $CaF_2$.

8. A device according to claim 2, characterised in that the assembly comprises an input (55) for the incident beam (11) of a first side (51) of the cube (50), an output (56) for the output beam (12) of a second side (52) of the cube (50) close to the first side (51), two convex diopters (61, 62) for the passage of the secondary beams (13, 14) respectively placed on the third (53) and fourth (54) sides of the cube (50) opposite to the first (51) and second (52) sides and two concave (63, 64) mirrors respectively facing the diopters (61, 62) at the same distance (e).

9. A device according to claim 8, characterised in that the diopters (61, 62) and the mirrors (63, 64) are spherical, whereas each diopter (61, 62) is aligned with the associated mirror (63, 64) along an axis (65, 66) perpendicular to the associated side (53, 54), and the radii r1 and r2 of the diopters (61, 62) and R1 and R2 of the mirrors (63, 64) are given in relation to the distance e between each of the diopters (61, 62) and the associated mirror (63, 64) and to two parameters q and Q by the equations:

$$R1 = e \cdot [Q/(Q+1)]$$
$$R2 = e \cdot [(Q/(Q-1)]$$
$$r1 = e \cdot [2(N-1)]/[Q(q+1)]$$
$$r2 = e \cdot [2(N-1)]/[Q(q-1)].$$

10. A device according to claim 9, characterised in that the parameters e, q and Q are chosen in order to minimise the differential aberrations of the assembly.

11. An achromatic interferential coronograph characterised in that it comprises a device according to claim 1.

12. A device for extinguishing a source in which:
   an incident luminous beam (10) is received, coming from a punctual central source,
   the incident beam (10) is sent to an interferometer (2, 50) and the incident beam (11) is separated into two secondary beams (13, 14) of the same optical power,
   the secondary beams (13, 14) are made to travel in the interferometer (2, 50) over optical trajectories of the same length and opposite enlargements are generated for the secondary beams (13, 14), causing pupil turn-up for one of the secondary beams, and
   the secondary beams (13, 14) are combined into an output beam (12), so that the punctual source has an extinguished contribution in the output beam (12),
   characterised in that each of the secondary beams (13, 14) passing through an optical system having focuses (F1, F2, F'1, F'2, C'1, C'2, S'1, S'2), principal planes (31, 32,

103, 104) and antiprincipal planes (33, 34, 105, 106), each of the focuses, principal planes and antiprincipal planes of one of the two optical systems is respectively superimposed on a focus, an antiprincipal plane and a principal plane of the other optical system after formation of the output beam (12) and each of the secondary beams (13, 14) having a number of passages through at least one of the focuses of the optical system corresponding to this secondary beam, the number of passages differs by an odd number.

* * * * *